United States Patent
Mo et al.

(10) Patent No.: US 11,620,180 B2
(45) Date of Patent: Apr. 4, 2023

(54) HOLO-ENTROPY ADAPTIVE BOOSTING BASED ANOMALY DETECTION

(71) Applicant: VMware, Inc., Palo Alto, CA (US)

(72) Inventors: Zhen Mo, Sunnyvale, CA (US); Bin Zan, Santa Clara, CA (US); Vijay Ganti, Fremont, CA (US); Vamsi Akkineni, Los Gatos, CA (US); HengJun Tian, Sunnyvale, CA (US)

(73) Assignee: VMWARE, INC., Palo Alto, CA (US)

( * ) Notice: Subject to any disclaimer, the term of this patent is extended or adjusted under 35 U.S.C. 154(b) by 1094 days.

(21) Appl. No.: 16/205,138

(22) Filed: Nov. 29, 2018

(65) Prior Publication Data

US 2020/0174867 A1    Jun. 4, 2020

(51) Int. Cl.
| | | |
|---|---|---|
| *G06F 9/44* | (2018.01) | |
| *G06F 11/07* | (2006.01) | |
| *G06F 21/56* | (2013.01) | |
| *G06F 11/34* | (2006.01) | |
| *G06N 20/20* | (2019.01) | |
| *G06F 9/455* | (2018.01) | |
| *H04L 9/40* | (2022.01) | |

(52) U.S. Cl.
CPC ........ *G06F 11/079* (2013.01); *G06F 11/0712* (2013.01); *G06F 11/0751* (2013.01); *G06F 11/3447* (2013.01); *G06F 21/562* (2013.01); *G06N 20/20* (2019.01); *G06F 9/45541* (2013.01); *G06F 2221/034* (2013.01); *H04L 63/14* (2013.01)

(58) Field of Classification Search
None
See application file for complete search history.

(56) References Cited

U.S. PATENT DOCUMENTS

| | | | |
|---|---|---|---|
| 9,692,662 B2 | 6/2017 | Chan et al. | |
| 10,177,998 B2 | 1/2019 | Parandehgheibi et al. | |
| 10,223,748 B2 | 3/2019 | Hunter et al. | |
| 10,255,124 B1 | 4/2019 | Bellingan et al. | |
| 10,432,652 B1 * | 10/2019 | Yona | H04L 63/1416 |
| 10,459,827 B1 * | 10/2019 | Aghdaie | G06N 20/00 |
| 2016/0080404 A1 | 3/2016 | Kohout et al. | |
| 2017/0070521 A1 | 3/2017 | Bailey et al. | |
| 2017/0090996 A1 | 3/2017 | Birke et al. | |

(Continued)

OTHER PUBLICATIONS

Harshe, Outliner detection using weighted Holoentropy, IJSTM, 2016. (Year: 2016).*

(Continued)

*Primary Examiner* — Insun Kang
(74) *Attorney, Agent, or Firm* — Patterson + Sheridan, LLP

(57) ABSTRACT

A computer-implemented method for determining whether data is anomalous includes generating a holo-entropy adaptive boosting model using, at least in part, a set of normal data. The holo-entropy adaptive boosting model includes a plurality of holo-entropy models and associated model weights for combining outputs of the plurality of holo-entropy models. The method further includes receiving additional data, and determining at least one of whether the additional data is normal or abnormal relative to the set of normal data or a score indicative of how abnormal the additional data is using, at least in part, the generated holo-entropy adaptive boosting model.

20 Claims, 11 Drawing Sheets

(56) References Cited

U.S. PATENT DOCUMENTS

| | | | |
|---|---|---|---|
| 2017/0277727 A1 | 9/2017 | Chen et al. | |
| 2017/0279848 A1* | 9/2017 | Vasseur | H04W 12/02 |
| 2017/0295078 A1 | 10/2017 | Medas et al. | |
| 2018/0020015 A1 | 1/2018 | Munro et al. | |
| 2018/0096261 A1* | 4/2018 | Chu | G06N 20/20 |
| 2018/0173894 A1 | 6/2018 | Boehler et al. | |
| 2018/0324199 A1 | 11/2018 | Crotinger et al. | |
| 2019/0173899 A1 | 6/2019 | Tews et al. | |
| 2019/0220336 A1 | 7/2019 | Maya | |
| 2019/0251251 A1* | 8/2019 | Carson | G06F 21/51 |
| 2019/0387005 A1 | 12/2019 | Zawoad et al. | |
| 2020/0019698 A1 | 1/2020 | Mo et al. | |
| 2020/0065212 A1* | 2/2020 | Chanda | G06F 11/3452 |
| 2020/0186409 A1 | 6/2020 | Mo et al. | |
| 2021/0224599 A1* | 7/2021 | Tajima | G06K 9/6276 |

OTHER PUBLICATIONS

Moorthy et al., Outlier Detection Through Unsupervised Approach With Holoentropy, IJETCSE, 2014 (Year: 2014).*

Zhao et al., An Efficient Entropy-based Network Anomaly Detection Method Using MIB, IEEE (Year: 2014).*

Mazzawi, Hanna et al., Anomaly Detection in Large Databases using Behavioral Patterning, Dec. 2017, IEEE 33rd International Conference on Data Engineering, pp. 1140-1149.

"Series M: TMN and Network Maintenance: International Transmission Systems, Telephone Circuits, Telegraphy, Facsimile and Leased Circuits", Feb. 2000, ITU, M.3400.

Zhihua Zhou, "Ensemble Methods: Foundations and Algorithms," Chapman & Hall/CRC, 2012.

"Quick Introduction to Boosting Algorithms in Machine Learning", https://www.analyticsvidhya.com/blog/2015/11/quick-introduction-boosting-algorithms-machine-learning, 2015.

Yoav Freund, Robert E. Schapire, "A decision-theoretic generalization of on-line learning and an application to boosting", Journal of Computer and System Sciences, 1997.

Jerome H. Friedman, "Greedy Function Approximation: A Gradient Boosting Machine", Annals of Statistics, 2000.

Tianqi Chen and Carlos Guestrin, XGBoost: A Scalable Tree Boosting System, Proceedings of the 22Nd ACM SIGKDD International Conference on Knowledge Discovery and Data Mining, 2016.

Shannon, C. E., "A Mathematical Theory of Communication", Bell System Technical Journal, 1948.

Attack: Microsoft Windows LSASS Memory Corruption, https://www.symantec.com/security_response/attacksignatures/detail.jsp?a sid=22582.

Shu Wu, Shengrui Wang, "Information-Theoretic Outlier Detection for Large-Scale Categorical Data", IEEE Transactions on Knowledge and Data Engineering, 2013.

* cited by examiner

HOLO-ENTROPY ADAPTIVE BOOSTING BASED ANOMALY DETECTION

BACKGROUND

In computer virtualization, physical computing platforms (referred to herein as "host servers" or "hosts") are used to run multiple virtual computing instances, such as virtual machines (VMs) that each encapsulates a computing machine platform or containers that are implemented via operating system-level virtualization. In a software defined network, such hosts are in communication over a physical network infrastructure and are further connected to logical overlay networks that may span multiple hosts and are decoupled from an underlying physical network infrastructure.

Processes such as those running in virtual computing instances may be susceptible to malicious attacks. When behaviors of such processes are observed, it can be difficult to discern whether the behaviors are anomalous and the severity of anomalous behaviors, especially when there is limited historical data on normal behaviors of the processes.

SUMMARY

Described herein is a solution, which may be implemented in any number of alternate embodiments, to the problems described above using holo-entropy adaptive boosting based anomaly detection. One embodiment provides a method for determining whether data is anomalous. The method generally includes generating a holo-entropy adaptive boosting model using, at least in part, a set of normal data. The holo-entropy adaptive boosting model includes a plurality of holo-entropy models and associated model weights for combining outputs of the plurality of holo-entropy models. The method further includes receiving additional data, and determining at least one of whether the additional data is normal or abnormal relative to the set of normal data or a score indicative of how abnormal the additional data is using, at least in part, the generated holo-entropy adaptive boosting model.

Further embodiments include a non-transitory computer-readable storage medium comprising instructions that cause a computer system to carry out the above method. Other embodiments include a processor and a memory that includes a program executable in the processor to perform operations to carry out the above method.

DETAILED DESCRIPTION

Embodiments disclosed herein provide techniques for detecting anomalies in data. Although certain embodiments are discussed herein with respect to data that is collected for processes running in virtual machines (VMs), techniques disclosed herein may be employed to detect anomalies in other types of data, including data associated with other virtual computing instances such as containers, or in some cases other devices. In the case of VMs, processes running therein, such as operating system (OS) processes, may each exhibit a behavior pattern that has some similarities among different instances running on different VMs. Such behavior patterns are referred to herein as "intended states" of the processes. It is possible for a process to have multiple intended states (such as a process that behaves differently when running in different domains such as on a domain controller versus on a web server), but it is unlikely for a process instance to have a completely different behavior pattern across various virtual machines, especially operating system processes. Once a process's intended states are observed, the intended states can be used as a baseline normal data set to determine whether data relating to additional observations of the process is normal or abnormal relative to the baseline.

In embodiments described herein, an intended state database for each process being monitored for anomalies is maintained, and a respective holo-entropy adaptive boosting (ada-boosting) model is created to detect anomalies in the behavior of each process that deviate from the intended state of the process. A holo-entropy ada-boosting model, also referred to herein as a "HEAB" model, is created in one embodiment by modifying the traditional holo-entropy algorithm to weight data points and applying an adaptive boosting technique. After a HEAB model is trained using the intended state information for a process, a data record may be created by extracting features from observed behavior(s) of the process or an alarm associated with the process. The HEAB model may then be applied to determine whether the created data record is normal or abnormal relative to the baseline intended states, as well as a score indicating the severity of an alarm.

Reference will now be made in detail to several embodiments, examples of which are illustrated in the accompanying figures. It is noted that wherever practicable similar or like reference numbers may be used in the figures and may indicate similar or like functionality. The figures depict embodiments for purposes of illustration only. Of course, alternative embodiments of the structures and method illustrated herein may be employed without departing from the principles described herein.

Figure 1:
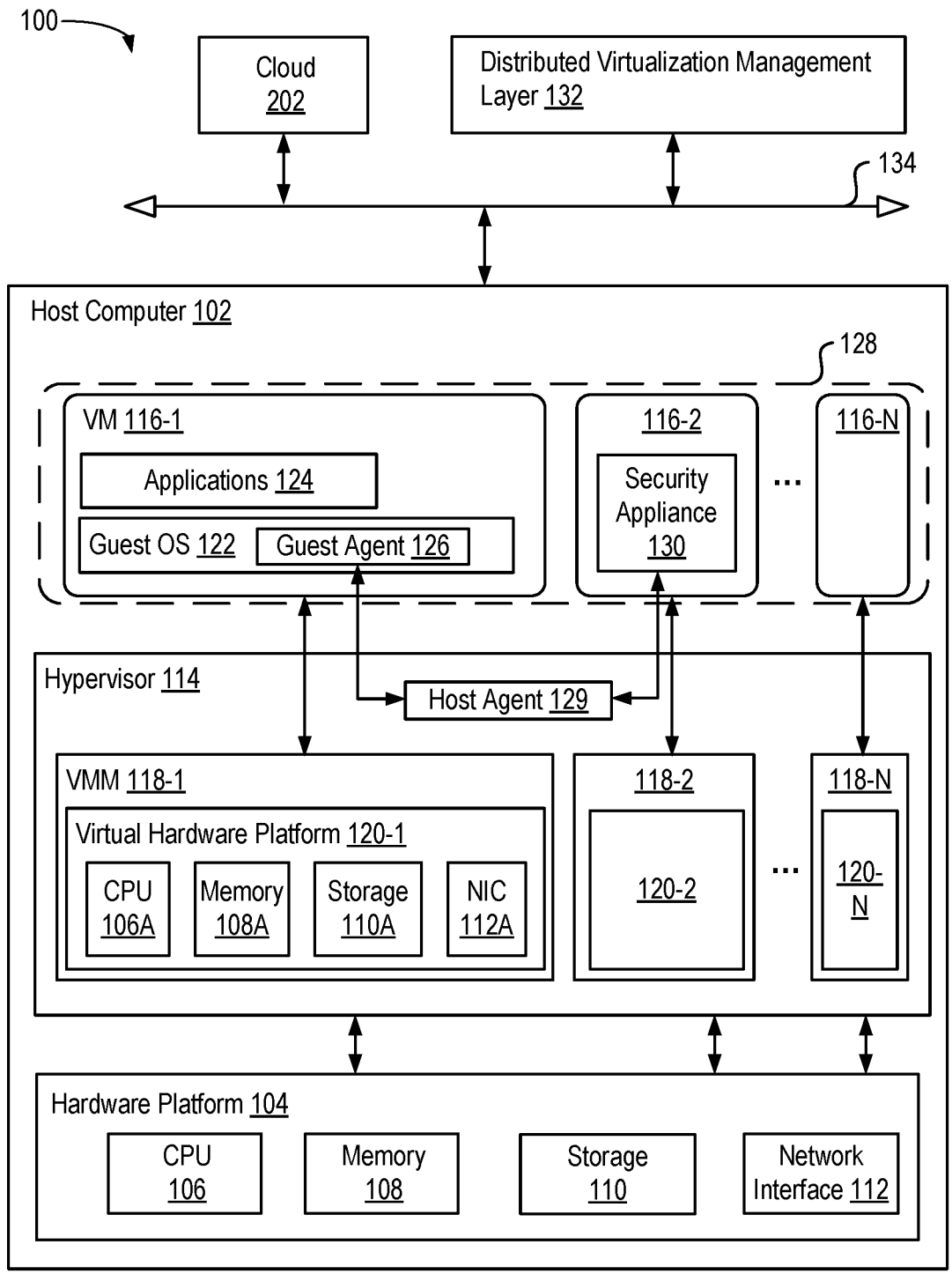
FIG. 1 illustrates a computing system that implements one or more embodiments.

FIG. 1 is a block diagram that illustrates a computing system 100 with which one or more embodiments of the present disclosure may be utilized. As illustrated, computing system 100 includes at least one host computer 102. Although a single host computer 102 is depicted for illustrative purposes in FIGS. 1-2 and 5, a computing system may generally include any number of host computers, which can be arranged in an interconnected server system such as a data center.

Host 102 is configured to provide a virtualization layer that abstracts computing resources of a hardware platform 104 into multiple resource consumers, such as virtual machines (VMs) 116 (or more generally referred to as "virtual computing instances") that run concurrently on the same host 102. Hardware platform 104 of host 102 includes CPU 106, memory 108, storage 110, networking interface 112, and other conventional components of a computing device. VMs 116 run on top of a software interface layer, referred to herein as a hypervisor 114, that enables sharing of the hardware resources of host 102 by the virtual machines. One example of hypervisor 114 that may be used in an embodiment described herein is a VMware ESXi™ hypervisor provided as part of the VMware vSphere® solution made commercially available from VMware, Inc. of Palo Alto, Calif. Hypervisor 114 provides a device driver layer configured to map physical resource of hardware platforms 104 to "virtual" resources of each VM 116 such that each VM 116-1 to 116-N has its own corresponding virtual hardware platform (e.g., a corresponding one of virtual hardware platforms 120-1 to 120-N). Each such virtual hardware platform 120 provides emulated hardware (e.g., memory 108A, processor 106A, storage 110A, network interface 112A, etc.) that may, for example, function as an equivalent, conventional hardware architecture for its corresponding VM 116. Virtual hardware platforms 120-1 to 120-N may be considered part of virtual machine monitors (VMMs) 118-1 to 118-N which implement virtual system support to coordinate operations between hypervisor 114 and corresponding VMs 116-1 to 116-N in the pool of VMs 128. Virtual storage 110A is commonly known as a virtual disk and hypervisor 114 provisions the virtual disk as one or more files in a file system managed by hypervisor 114.

Hypervisor 114 may run on top of a host operating system of host 102 or directly on hardware components of host 102. Each VM 116 includes a guest operating system 122 (e.g., Microsoft Windows®, Linux™) and one or more guest applications and processes running on top of guest operating system 122. Guest OS 122 further includes a guest agent 126, and hypervisor 114 further includes a host agent 129 that is in communication with guest agent 126 and a security appliance 130 running in VM 116-2, as discussed in greater detail below. In systems that include multiple host computers, each such host may include a host agent, and those host agents may communicate with a security appliance running in one of the hosts. Further, host 102 communicates with cloud 202 and distributed virtualization management layer 132 via network 134. Host 102 utilizes network interface 112 to couple to network 134.

As shown, computing system 100 further includes distributed virtualization management layer 132 that communicates with hosts such as host 102. Distributed virtualization management layer 132 is configured to carry out administrative tasks for the computing system 100, including managing hosts, managing VMs running within hosts, provisioning VMs, migrating VMs from one host to another host, and load balancing between hosts. Distributed virtualization management layer 132 may comprise a distributed architecture made up of a plurality of nodes. Nodes can comprise microservices, VMs, or containers, or other resource consumers running on hosts in some embodiments. For example, distributed virtualization management layer 132 may be a computer program that resides and executes in a central server, which may reside in computing system 100, or alternatively, run as a VM in a host. A particular example of a distributed virtualization management layer 132 is the ESXCloud product made available from VMware, Inc.

Cloud 202 includes hardware resources, storage resources, and networking resources (not shown). Hardware resources may include a number of physical servers/hosts (e.g., hosts 105). Storage resources may include a storage area network (SAN), distributed virtual SAN, or network-attached storage (NAS) and other network data storage systems. Networking resources may include switches, routers, and other network devices for connecting hosts together, hosts to storage resources, and hosts with network entities outside cloud 202. In some embodiments, cloud 202 is configured as a dedicated cloud service for a single tenant comprised of dedicated hardware resources. In other embodiments, cloud 202 is configured as part of a multi-tenant cloud service with logically isolated virtualized computing resources on a shared physical infrastructure. Processes and applications can be executed on the hardware resources of cloud 202. For example, processes and applications can be directly executed on hosts of cloud 202, or in VMs or other virtual entities running on hosts of cloud 202. These processes and applications may communicate with one another over the network resources, or may even be located on the same hardware resource.

In embodiments, anomaly detection and/or alarm verification according to techniques disclosed herein are implemented in system 100. Illustratively, security appliance 130 running in host 102 is in communication with host agent 129 and facilitates communication of behavior and alarm information between host 102 and components in cloud 202. Guest agents (e.g., guest agent 126) running VMs (e.g., VMs 116-1 to 116-N) communicate with host agent 129 to monitor the kernel integrity of the guests. Host agents (e.g., host agent 129) may be software virtual installation bundles deployed to hypervisors and provide trusted isolation within the hypervisors to store the manifests of context of protected applications to be monitored against. In one embodiment, anomaly detection and alarm verification may be performed in a discovery mode and a protected mode, respectively. In the discovery mode, behaviors of a process are learned, and the discovery mode precedes the protected mode, in which any behavior not learned during the discovery mode will raise an alarm. For example, VMs may be placed in the discovery mode for a period of time in order to observe behaviors of processes running in the VMs and convert the behaviors into rules, and then the VMs may be migrated to the protected mode, in which alerts are generated for any behavior that violates the previously learned rules. When behaviors are learned during the discovery mode, all events (e.g., network connections) for a process are considered as allowed behaviors, but anomaly detection is employed to protect against learning anomalous behaviors that differ significantly from intended states of the process. In the protected mode, any event (e.g., a network connection) that was not learned as a behavior of the process in the discovery mode raises an alarm. Alarm verification is employed during the protected mode to suppress excessive false alarms. In one embodiment, a holo-entropy ada-boosting model may be applied to implement anomaly detection during the discovery mode and alarm verification during the protected mode, so that it can be determined whether observed behaviors are normal or abnormal relative to the baseline intended states, as discussed in greater detail below.

Figure 2:
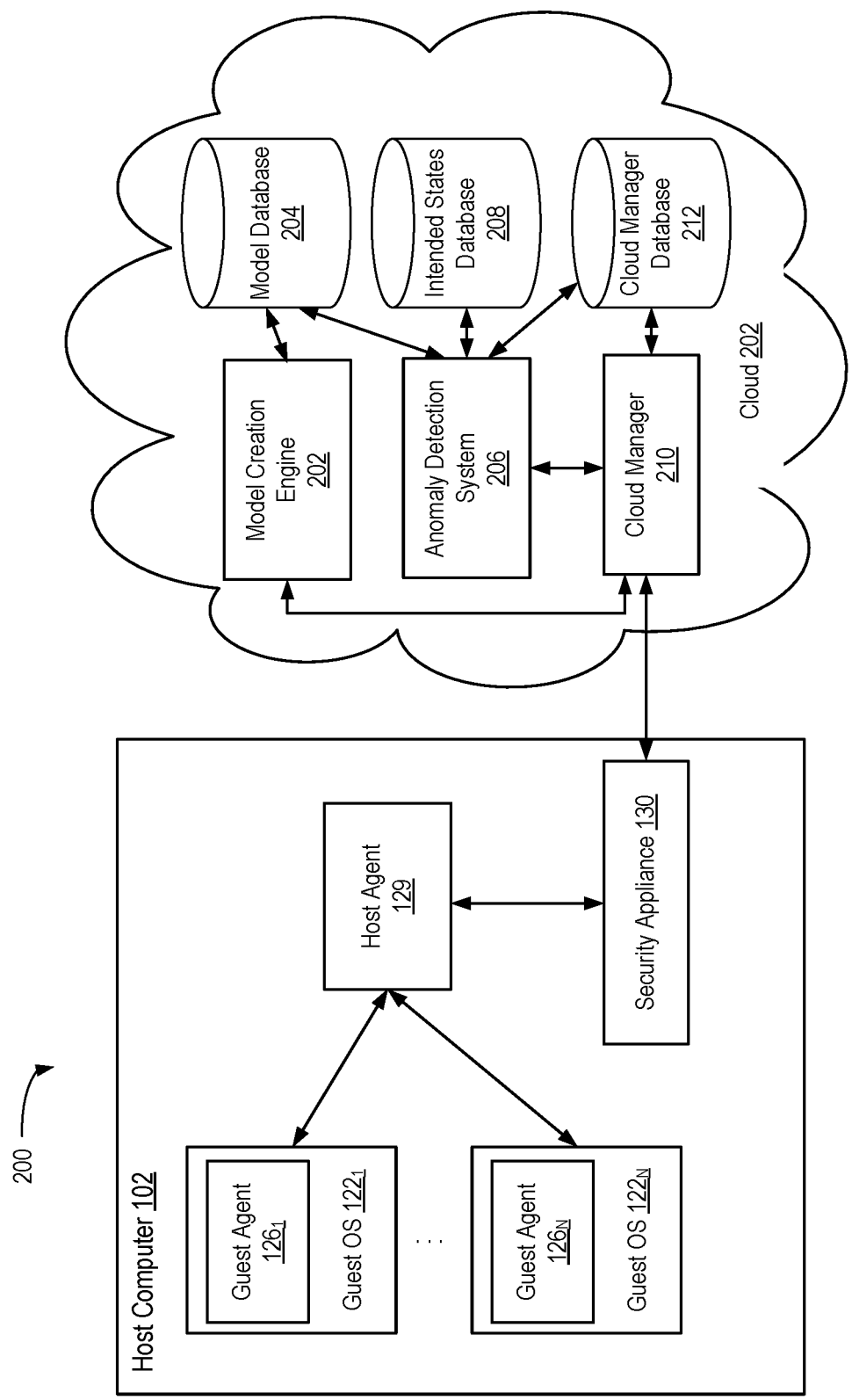
FIG. 2 illustrates components of a computing system that may be used to implement anomaly detection, according to an embodiment.

FIG. 2 illustrates components of host 102 and cloud 202 that may be used to implement anomaly detection, according to an embodiment. As described with respect to FIG. 1, guest agents $126_{1-N}$ reside in guest OSes $122_{1-N}$ on host 102. Also residing on host 102 are host agent 129 and security appliance 130. Security appliance 130 facilitates communication regarding behaviors and alarms with cloud 202. Cloud 202 includes a cloud manager 210 that is responsible for provisioning security appliances (e.g., security appliance 130) on hosts, as well as storing data in a cloud manager database 212 and running logic to perform various tasks as described herein.

Cloud 202 further includes a model creation engine 202, a model database 204 in which created models are stored, an anomaly detection system 206, and an intended states database 208. Although shown as distinct databases for illustrative purposes, some of the databases described herein may also be combined in embodiments. In one embodiment, model creation engine 202 is responsible for creating and verifying HEAB models offline, prior to anomaly detection and alarm verification. In such a case, normal behavior data for a process is first collected and stored as intended states in intended states database. As used herein, an "intended state" is a data set comprising information on one or more behaviors that are indicative of a healthy computing environment (e.g., indicative of no unwanted behaviors in the data set), and an intended state may also be referred to herein as including the one or more behaviors. It should be noted that an intended state of a process is different from the behavior history of the process running in a VM, as the intended state is typically generated from behaviors of the process monitored on different VM(s). In embodiments, an intended state may be generated by cloud manager 210 from one or more monitored behaviors on one or more VMs over an observation period, as described in U.S. patent application Ser. No. 16/032,349, filed Jul. 11, 2018 and entitled "Entropy Based Security Detection System," which is incorporated herein by reference in its entirety. An intended state generated during a short observation period may not include information indicative of all permissible behaviors. For example, data points comprising feature values may be collected for three days during the discovery mode, but some features may not be observed during that time. In this case, the system may return a false positive by identifying a previously unobserved but permissible behavior as a security threat. Therefore, in one embodiment anomaly detection and alarm verification may only use (or analyze) a subset of the information indicative of one or more behaviors (e.g., a subset comprising only information indicative of the features that return a "TRUE" value, and one or more features that return a "FALSE" value are ignored), in order to reduce the number of false positives.

Using intended states information as normal data, model creation engine 202 creates a holo-entropy ada-boosting model for each process to be monitored in a manner, discussed below, that is similar to supervised learning, and model creation engine 202 stores the created models in model database 204. For example, two tables in model database 204 may be used to store model weights and data point weights of the holo-entropy ada-boosting models. Then, during a discovery mode period for a process (e.g., running in a VM) in which normal behaviors of the process are learned, anomaly detection system 206 utilizes a stored holo-entropy ada-boosting model associated with the process to detect anomalies and to protect against learning anomalous behaviors that differ significantly from intended states of the process. In one embodiment, behavior data may be continuously collected and stored by cloud manager 210 in cloud manager database 212, and, in turn, anomaly detection system 202 periodically (e.g., every five minutes) accesses the database 212 to retrieve data to verify using the appropriate holo-entropy ada-boosting models and sends results of the verification back to the database 212. The results may also be read by cloud manager 210 and displayed to a user.

Entropy, as used in information theory, refers to uncertainty of a random variable. Generally, entropy is a measure of the order or consistency of a plurality of data points in a data set, and the lower the entropy, the more consistent the data set is as a whole. Holo-entropy is a technique for identifying outliers (or unwanted behaviors) in a data set that combines entropy and total correlation, which is the amount of information shared among variables in the data set. Further, it can be computationally expensive to test whether a data record is normal or abnormal by removing the data record from a data set and calculating how holo-entropy changes. An "outlier factor" has been used instead to measure whether a data record is an outlier.

However, experience has shown that holo-entropy can only effectively determine whether data points deviate from a baseline when the baseline is composed of a set of normal data points from a unimodal distribution with one peak. If the data points in the baseline are from a multimodal distribution with more than one peak, then data points coming from minor modes in the baseline may be considered as anomalies, thereby increasing the false positive rate during anomaly detection. In order to solve this problem, embodiments described herein create and utilize holo-entropy ada-boosting models to detect anomalies in data. As discussed in greater detail below, modifications are made to the traditional holo-entropy algorithm, and adaptive boosting is applied, to train holo-entropy ada-boosting models. Another problem is that the model can only be trained using a limited set of normal data in some cases, rather than a large set of both normal and abnormal data. For example, in the case of a process being monitored, there may be large variability in abnormal behaviors for which training data is not fully available, and the amount of normal behavior data may also be limited. Embodiments described herein employ holo-entropy ada-boosting models which can be trained using a relatively small set of normal data.

More formally, suppose the data set $\chi$ contains n data points $x_1, x_2, \ldots, x_n$, each data point $x_i$ for $1 \leq i \leq n$ being a vector of m categorical features. Let the $j^{th}$ feature $y_j$ be a random variable with k values $c_{1,j}, c_{2,j}, \ldots, c_{k,j}$, and the random vector of features $[y_1, y_2, \ldots, y_m]$ be Y. The number of data points in data set $\chi$ whose $j^{th}$ feature value is $c_{l,j}$ can be counted as $$n_{c_{l,j}},$$

where $l \in [1,k]$, and the probability of each feature can be calculated as $$p[y_i][c_{l,j}] = n_{c_{l,j}}/n, \text{ where } j \in [1, m], \quad (1)$$

$$l \in [1, k], \text{ and } \sum_{l=1}^{k} n_{c_{l,j}} = n.$$

The entropy of a feature $y_j$ is defined as $$H_\chi(y_j) \Sigma_{l=1}^{k} p[y_j][c_{l,j}] \log(p[y_j][c_{l,j}]), \quad (2)$$

and the entropy of the feature vector Y is $$H_\chi(Y) = \Sigma_{j=1}^m H_\chi(y_i|y_{i-1},\ldots,y_1). \quad (3)$$

The holo-entropy of Y is defined as the summation of such an entropy and the total correlation $C_\chi(Y)$:

$$HL_\chi(Y) = H_\chi(Y) + C_\chi(Y) = \Sigma_{j=1}^m H_\chi(y_i). \quad (4)$$

As described, the deviation of a data point from the normal data set may be calculated as an outlier factor, which may be defined for a data point $x_i$ as $$OF(x_i) = \sum_{j=1}^m \begin{cases} 0, & \text{if } n(x_j) = 1 \\ w_\chi(y_j) \cdot \delta[n(y_j)], & \text{otherwise} \end{cases}, \quad (5)$$

where $$w_\chi(y_j) = 2\left(1 - \frac{1}{1 + \exp(-H_\chi(y_j))}\right),$$

$n(y_j)$ represents the number of times $y_j$ appears in the $j^{th}$ feature, and $\delta(x) = (x-1)\log(x-1) - x\log(x)$. Experience has shown that the distribution of outlier factors for different data records are typically one lognormal distribution. Accordingly, the mean ($\mu$) and standard deviation ($\sigma$) of outlier factors may be used to determine a threshold beyond which values are considered outliers, such as $$\text{threshold} = \mu + 2 \cdot \sigma. \quad (6)$$

Embodiments modify the traditional holo-entropy algorithm, shown below as algorithm 1, and apply adaptive boosting as well. Algorithm 1 takes as input a baseline data set D and a test data point $x_o$, and outputs a verification result of whether the test data point is normal or abnormal. In algorithm 1, a new data set D' is first created by adding $x_o$ into the input data set D. Then, a number of outliers T is determined using the distribution of outlier factors. Thereafter, the holo-entropy algorithm is applied on the new data set D' to select T outliers. If the test data point $x_o$ is among the T outliers, then $x_o$ is abnormal. Otherwise, $x_o$ is normal.

---

Algorithm 1: Holo - entropy based anomaly detection (HL[D, $D_{test}$])
Data: Given normal dataset D = $[x_1, \ldots, x_n]$, where $x_i \in \chi$ and a set of test data point $D_{test} = [x_o^1, \ldots x_o^m]$
Result: $D_{normal}$, $D_{abnormal}$
for j ← 1 to m do
    D' ← D + $\{x_o^j\}$
    Calculate probability of each feature in D'
    Calculate Holo − entropy for each data point in D'as 0 F
    Calculate the number of outliers as T
    for t ← 1 to T do
        Find the data point x with the maximum outlier factor in 0 F
        if x is $x_o$ then
            Add $x_o$ into $D_{abnormal}$
        end
        Remove x from 0 F
        Update outlier factors 0 F
    end
    Add $x_o$ into $D_{normal}$
end
return $D_{normal}$, $D_{abnormal}$

---

Embodiments modify the holo-entropy algorithm so that adaptive boosting can be applied. In one embodiment, each data point in the baseline is assigned a weight value $\eta_i$, where $i \in [1,n]$. And instead of counting the number of data points, the weight of each data point is added and the result divided by the total weight to calculate the probability of equation (1), giving:

$$p[y_j][c_{l,j}] = \sum_{y_j = c_{l,j}} \frac{\eta_i}{\sum_{i=1}^m \eta_i}, \quad (7)$$

where $j \in [1,m]$ and $l \in [1,k]$. Further, the $n(y_j)$ in equation (5) should no longer represent the number of times that $y_j$ appears in the jth feature, but instead is used to represent the weighted summation of $y_j$ in the jth feature:

$$OF(x_i) = \sum_{j=1}^m \begin{cases} 0, & \text{if } n(x_j) = 1 \\ w'_\chi(y_j) \cdot \delta[\eta(y_j)], & \text{otherwise} \end{cases}. \quad (8)$$

A score is also calculated for each test data point, with different formulas being used to calculate the score res(x) for outlier factors greater and less than a threshold value, as shown in equation (9). Such a score is used to represent how normal or abnormal a data point is in each holo-entropy model of the holo-entropy ada-boosting model, as information on how normal or abnormal the data point is would be lost if the holo-entropy models only output normal or abnormal as in algorithm 1.

$$res(x) = \begin{cases} \dfrac{OF(x) - OF_{min}}{OF_{threshold} - OF_{min}}, & \text{if } OF(x) \leq \text{threshold} \\ -1 + \dfrac{OF_x - OF_{threshold}}{OF_{max} - OF_{threshold}}, & \text{if } OF(x) > \text{threshold} \end{cases}. \quad (9)$$

Any suitable threshold may be used in equation (9), and different threshold values may generally be selected for, e.g., different application domains. For example, the threshold=$\mu+2\cdot\sigma$ in equation (6), or another threshold based on the mean ($\mu$) and standard deviation ($\sigma$) of outlier factors such as 1 or 3 standard deviations from the mean, may be used to determine outlier factor values that are outliers. In one embodiment, scores res(x) in the range (0, 1] may be considered normal, while scores in the range [−1, 0) may be considered abnormal. With these modifications to the holo-entropy algorithm, giving a modified holo-entropy algorithm HL', a HEAB model may be created according to algorithm 2.

---

Algorithm 2: Creating HEAB
Data: Given normal dataset $D^1 = [(x_1, y_1, \eta_1^1), \ldots, (x_n, y_n, \eta_n^1)]$, test dataset $D_{test} = [x_1, \ldots, x_n]$, where $x_i \in \chi$, $y_i = 1$, $\eta_i^1 = 1$ and $i \in [1, n]$
Result: H, A, T where H = $[H_1, \ldots, H_T]$, $H_i = [\eta_1^i, \ldots, \eta_n^i]$ and A = $[\alpha_1, \ldots, \alpha_T]$
t ← 1
while overfitting check passed and $\epsilon_t <= \epsilon_{t-1}$ do
    $D_{abnormal}, D_{normal}$ ← HL'($D^t$, $D_{test}$)
    $\epsilon_t$ ← len($D_{abnormal}$)/len($D^t$)

Choose $\alpha_t = \gamma \ln\left(\dfrac{1 - \epsilon_t}{\epsilon_t}\right)$

Update: $\eta_{t+1}(i) = \dfrac{\eta_t(i)}{Z_t} * e^{\alpha_t}$, where $HL(x_i) \neq y_i$ and $Z_t$ is a normalization factor
    t ← 1 + t
end

---

Figure 3:
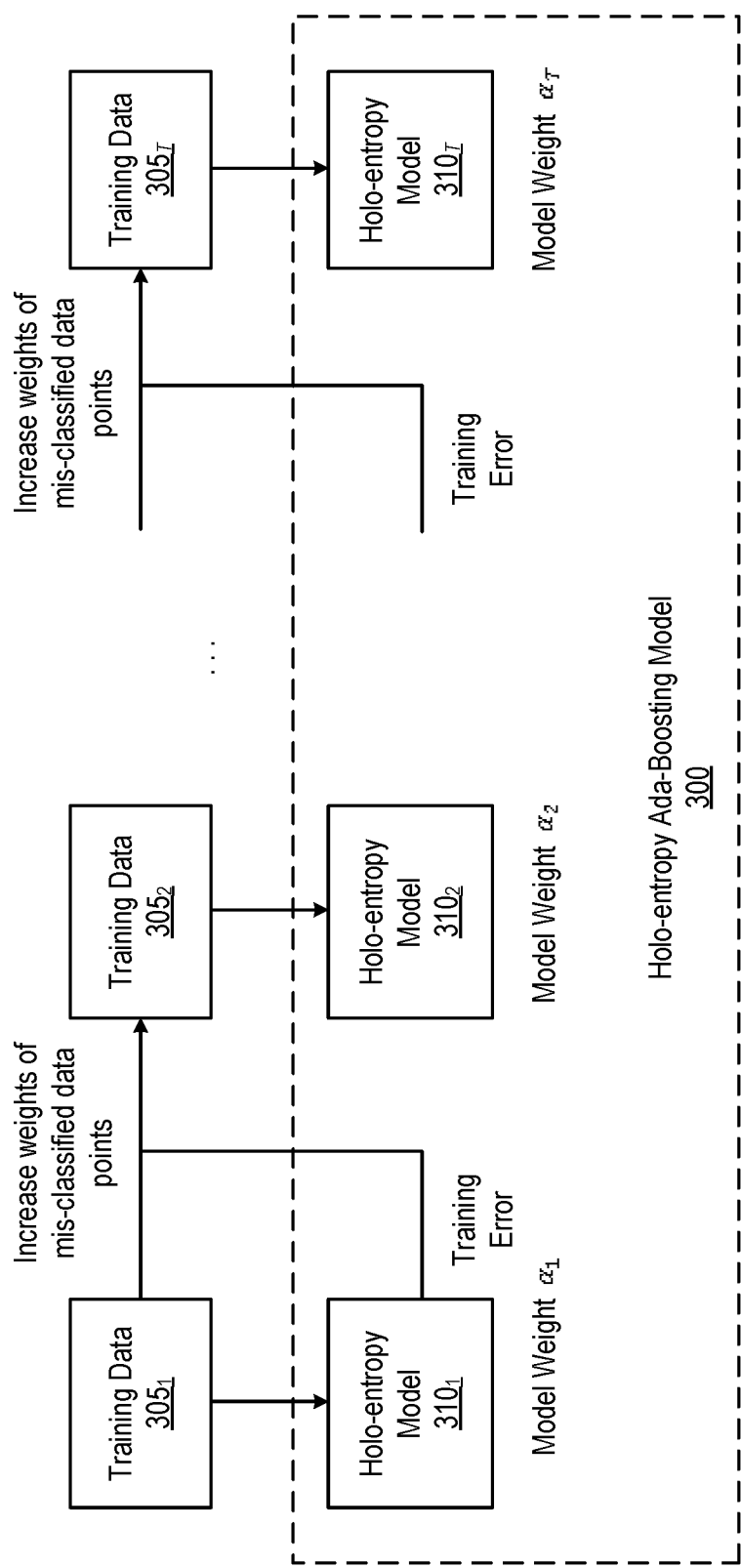
FIG. 3 illustrates an approach for creating a holo-entropy ada-boosting model, according to an embodiment.

In algorithm 2, holo-entropy models (the $H_i$'s in H= $[H_1, \ldots, H_T]$) are repeatedly added, and associated model weights (the $\alpha_i$'s in A=$[\alpha_1, \ldots, \alpha_T]$) are determined, according to an adaptive boosting technique, so long as an overfitting check passes and the training error, which is initialized to 1, is decreasing. Each of the holo-entropy models includes the weight of each data point, i.e., $H_i = [\eta_1^i, \ldots, \eta_n^i]$, which are determined by increasing the weights of data points that are mis-classified at each iteration of the loop, until overfitting is identified. This process is illustrated in FIG. 3, in which a strong learner, shown as holo-entropy ada-boosting model 300, is created starting from a data set $305_1$ (which is the input data set $D^1$ in algorithm 2) in which the weight of each data point is the same. After training a first weak learner, shown as holo-entropy model $310_1$, a training error $\varepsilon_0$ and a mis-classified set of data points is determined, based on which the second weak learner, shown as holo-entropy model $310_2$, is created by increasing the weights of the mis-classified data points and using the modified training data set to train the second weak learner. Such weak learners are repeatedly added until a termination condition is met, which in algorithm 2 requires the overfitting check to not pass or the training error to not be decreasing. The holo-entropy models $310_1$ to $310_T$ that have been created may then be used to construct the HEAB model 300.

Model weights $\alpha_i$ are used to weight each of the holo-entropy models in constructing the HEAB model. That is, individual holo-entropy models are weak learners that can be combined using the model weights $\alpha_i$ to obtain the HEAB model, which is the strong learner. In one embodiment, the model weights are determined based on their training errors. In algorithm 2 in particular, the model weights $\alpha_i$ are made up of two parts, the error weight ln $$\left(\frac{1-\epsilon_t}{\epsilon_t}\right)$$

and the learning rate hyperparameter $\gamma$. Experience has shown that some values of the learning rate hyperparameter $\gamma$, such as $\gamma=0.5$, can easily result in overfitting when training a HEAB model. In one embodiment, an additional loop is performed to search for a value of the learning rate hyperparameter $\gamma$ that produces a HEAB model with the lowest error. For example, such a search may start from $\gamma=0.01$ and go to $\gamma=1$ in increments of 0.01. Further, although algorithm 2 is provided for exemplary purposes, it should be noted that in general, any suitable adaptive boosting technique may be utilized, such as XGBoost.

As the HEAB model is trained using only a normal data set (and not an abnormal data set) in algorithm 2, overfitting may occur. In one embodiment, a small set of data points which are truly abnormal but likely to be considered as normal is used as a set of sensitive data points. For example, one sensitive data point may be created to include features from a process that is behaving normally, except for one anomalous behavior such as attempting to connect to a different TCP port. The overfitting check in algorithm 2 may determine whether sensitive data points are classified as normal by the HEAB model, indicating that overfitting has occurred. Intuitively, it is desirable to shrink the distribution of the outlier factor so that fewer behaviors are treated as abnormal, reducing the false-positive rate. However, overfitting may occur if the HEAB model begins treating all data points as normal, such as if the HEAB model treats sensitive data points that are actually abnormal as normal. If the sensitive data points are classified as normal by the HEAB model during training, then the training is stopped and the current holo-entropy model is dropped.

Figure 4:
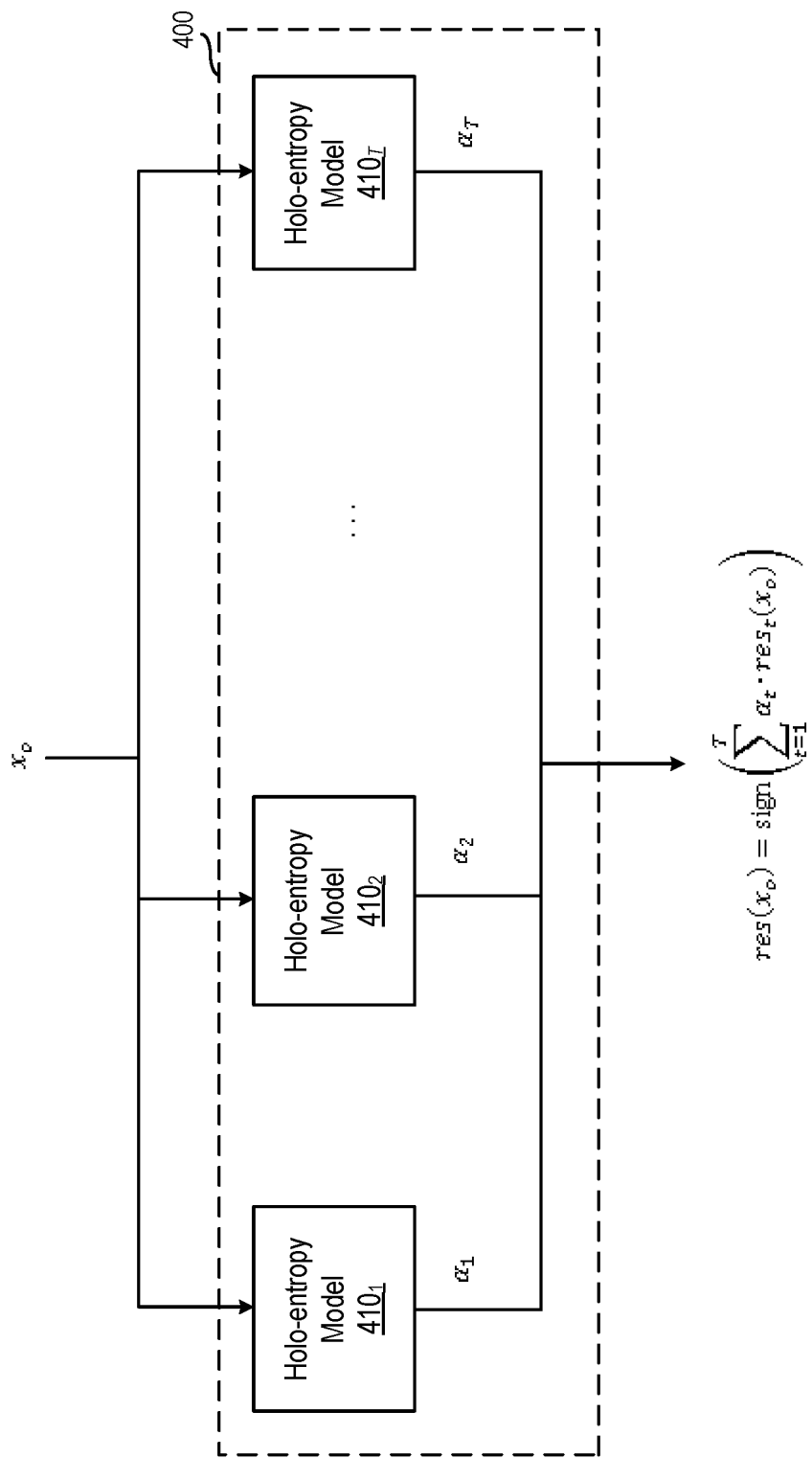
FIG. 4 illustrates an approach for using a holo-entropy ada-boosting model to detect anomalies in data, according to an embodiment.

After a HEAB model is created, anomaly detection system 206 may use the HEAB model to detect anomalies according to algorithm 3, below. The inputs to algorithm 3 are a normal data set D with n data points, each data point having m features, multiple holo-entropy models in the form of a sequence of data point weight sets $H=[H_1, \ldots, H_T]$, a sequence of model weights $A=[\alpha_1, \ldots, \alpha_T]$, and a test data point $x_o$. Algorithm 3 then loops through the received holo-entropy models, performs the modified holo-entropy algorithm described above for each of the holo-entropy models to determine a respective score $res_t(x_o)=HL'(x_o, X, H_t)$, and combines those scores into a single score, indicating whether the test data point is normal or abnormal, using the model weights associated with the holo-entropy models. As shown, the scores output by individual holo-entropy models are combined with a weighted majority vote function res $(x_o)=sign(\Sigma_{t=1}^T \alpha_t \cdot res_t(x_o))$ in one embodiment. This process is also illustrated in FIG. 4, which shows HEAB model 400 taking as input test data $x_o$, which is fed to each of the holo-entropy models $410_1$ to $410_T$ in HEAB model 400, whose classification results are $res_1(x_o)$ to $res_T(x_o)$ are combined using appropriate model weights $\alpha_1$ to $\alpha_T$ into the final weighted majority vote $res(x_o)=sign(\Sigma_{t=1}^T \alpha_t \cdot res_t(x_o))$. Although described for simplicity with respect to a single test data point, multiple test data points may also be taken as input and determined to be normal or abnormal.

---

Algorithm 3: Verifying a test data point using a HEAB model
Data: Given normal dataset $D = [x_1, \ldots, x_n]$, where $x_i \in \chi$, $H = [H_1, \ldots, H_T]$, $A = [\alpha_1, \ldots, \alpha_T]$, and $x_o$
Result: Normal or abnormal
for t ← 1 to T
    $res_t(x_o) = HL'(x_o, X, H_t)$
end $$res(x_o) = sign\left(\sum_{t=1}^{T} \alpha_t \cdot res_t(x_o)\right)$$

---

In embodiments, any suitable processes may be selected for monitoring and anomaly detection using HEAB models, such as processes that commonly exist in most VMs, processes that relate to network behaviors, and processes that have been utilized in previous attacks. In one example, based on these criteria, a good candidate process group is operating system processes, such as the processes listed in Table 1 that run on most Windows® systems and create a number of network behaviors. There are also many known attacks that utilize these system processes.

TABLE 1

| | |
|---|---|
| 1 | C:\Windows\system32\lsass.exe |
| 2 | C:\Windows\system32\services.exe |
| 3 | C:\Windows\System32\spoolsv.exe |
| 4 | C:\Windows\system32\svchost.exe -k LocalService |
| 5 | C:\Windows\System32\svchost.exe -k netsvcs |
| 6 | C:\Windows\system32\svchost.exe -k Network Service |
| 7 | C:\Windows\System32\svchost.exe -k utcsvc |
| 8 | System |

After the processes are selected, behaviors of these processes can be observed in a testing environment. For example, all network connections made by the processes may be recorded, and an example connection observed from one process is illustrated below:

id|remote_address|remote_port|created_at|updated_at|allowed_behavior_id|connection_type|destination_service_id|created_by_id|local_address|local_port|protocol|origin 710082|10.350.0.2|489|3018-03-09|21:54:14.314-08|3018-03-09 21:54:14.314-08|17569|OUT||747|*|*|TCP|DISCOVERED In this example, the remote_address field is a remote address of the connection, the remote_port field is a remote port number of the connection, the connection_type shows whether the connection is outbound or inbound, the local_address is a local address of the connection, the local_port field is a local port number of the connection, and the protocol may be either "TCP" or "UDP."

Based on the behaviors observed, features can be extracted and defined. These features can make up a data set of records that define an intended state of a process. In an example embodiment of a number of features illustrated below in Table 2, all the features are Boolean values. The first 12 features are fixed, while features 13 to 24 are dynamically generated according to the number of inbound and outbound connection on well-known ports. Port numbers in the range from 0 to 1023 are referred to as well-known ports or system ports. The well-known ports are used by system processes that provide common network services.

As an example, if a process instance made outbound TCP connections on port 545 and port 80, and made inbound UDP connections on port 43, then three features are created: outgoingWellKnownTCPPort_545, outgoingWellKnownTCPPort_80, and inboundWellKnownUDPPort_43.

Figure 5:
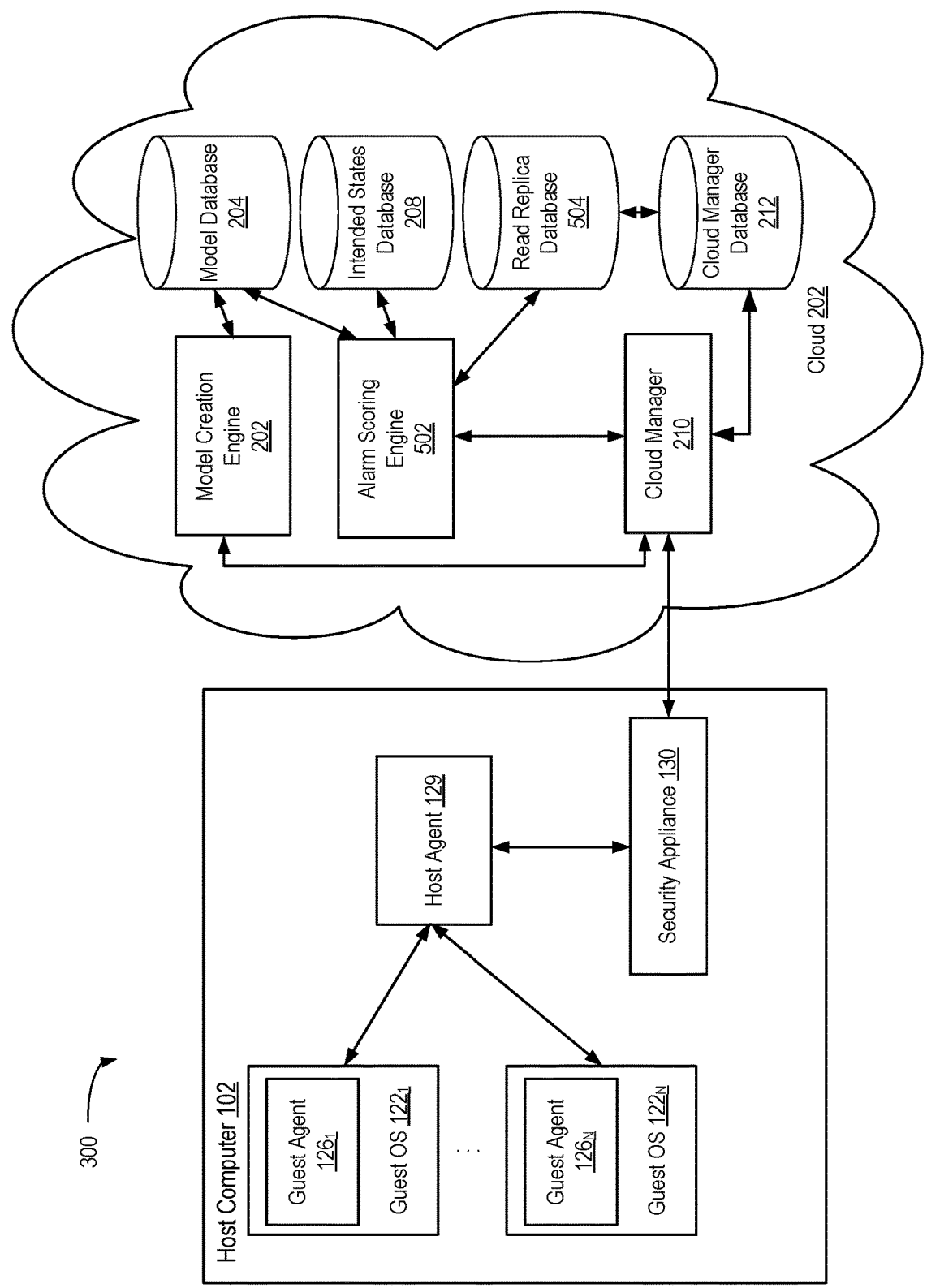
FIG. 5 illustrates components of a computing system that may be used to implement alarm verification, according to an embodiment.

FIG. 5 illustrates components of host 102 and cloud 202 that may be used to implement alarm verification, according to an embodiment. As shown, host 102 includes the same guest agents $126_{1-N}$ residing in guest OSes $122_{1-N}$, and security appliance 130 described above with respect to FIGS. 1-2. Cloud 202 also includes the same cloud manager 210, cloud manager database 212, intended states database 208, model creation engine 202, and model database 204 described above with respect to FIG. 2.

Cloud 202 further includes an alarm scoring engine 502 and a read replica database 504. As describe, model creation engine 202 is responsible for the offline creation and verification of holo-entropy ada-boosting models for processes, such as the processes described above, prior to anomaly detection and alarm verification. During alarm verification in particular, events (e.g., network connections) representing behaviors that were not learned in a discovery mode may raise alarms in a protected mode, and alarm scoring engine 502 determines whether observed alarms are normal or abnormal and assigns a score using one or more holo-entropy adaptive boosting models, as described in further detail below.

TABLE 2

| Index | Feature Name | Data Type | Explanation |
|---|---|---|---|
| 1 | outgoingIPv4HasPublic | bool | Connected to outbound public IPv4 address |
| 2 | outgoingIPv4hasPrivate | bool | Connected to outbound private IPv4 address |
| 3 | outgoingIPv6hasPublic | bool | Connected to outbound public IPv6 address |
| 4 | outgoingIPv6hasPrivate | bool | Connected to outbound private IPv6 address |
| 5 | outgoingHasEphemeralTCPPort | bool | Connected to outbound ephemeral TCP port |
| 6 | outgoingHasEphemeralUDPPort | bool | Connected to outbound ephemeral UDP port |
| 7 | outgoingHasTCPOtherPort | bool | Connected to outbound other TCP port |
| 8 | outgoingHasUDPOtherPort | bool | Connected to outbound other UDP port |
| 9 | inboundHasEphemeralTCPPort | bool | Has inbound connection on ephemeral TCP port |
| 10 | inboundHasEphemeralUDPPort | bool | Has inbound connection on ephemeral UDP port |
| 11 | inboundHasOtherTCPPort | bool | Has inbound connection on other TCP port |
| 12 | inboundHasOtherUDPPort | bool | Has inbound connection on other UDP port |
| 13 | outgoingWellKnownTCPPort_X1 | bool | Connected to outbound TCP well-known port XI |
| 14 | ... | ... | ... |
| 15 | outgoingWellKnownTCPPort_Xn | bool | Connected to outbound TCP well-known port Xn |
| 16 | outgoingWellKnownUDPPort_Y1 | bool | Connected to outbound UDP well-known port Y1 |
| 17 | ... | ... | ... |
| 18 | outgoingWellKnownUDPPort_Yn | bool | Connected to outbound UDP well-known port Yn |
| 19 | inboundWellKnownTCPPort_Z1 | bool | Has inbound connection on TCP well-known port Z1 |
| 20 | ... | ... | ... |
| 21 | inboundWellKnownTCPPort_Zn | bool | Has inbound connection on TCP well-known port Zn |
| 22 | inboundWellKnownUDPPort_P1 | bool | Has inbound connection on UDP well-known port Pl |
| 23 | ... | ... | ... |
| 24 | inboundWellKnownUDPPort_Pn | bool | Has inbound connection on UDP well-known port Pn |

Figure 6:
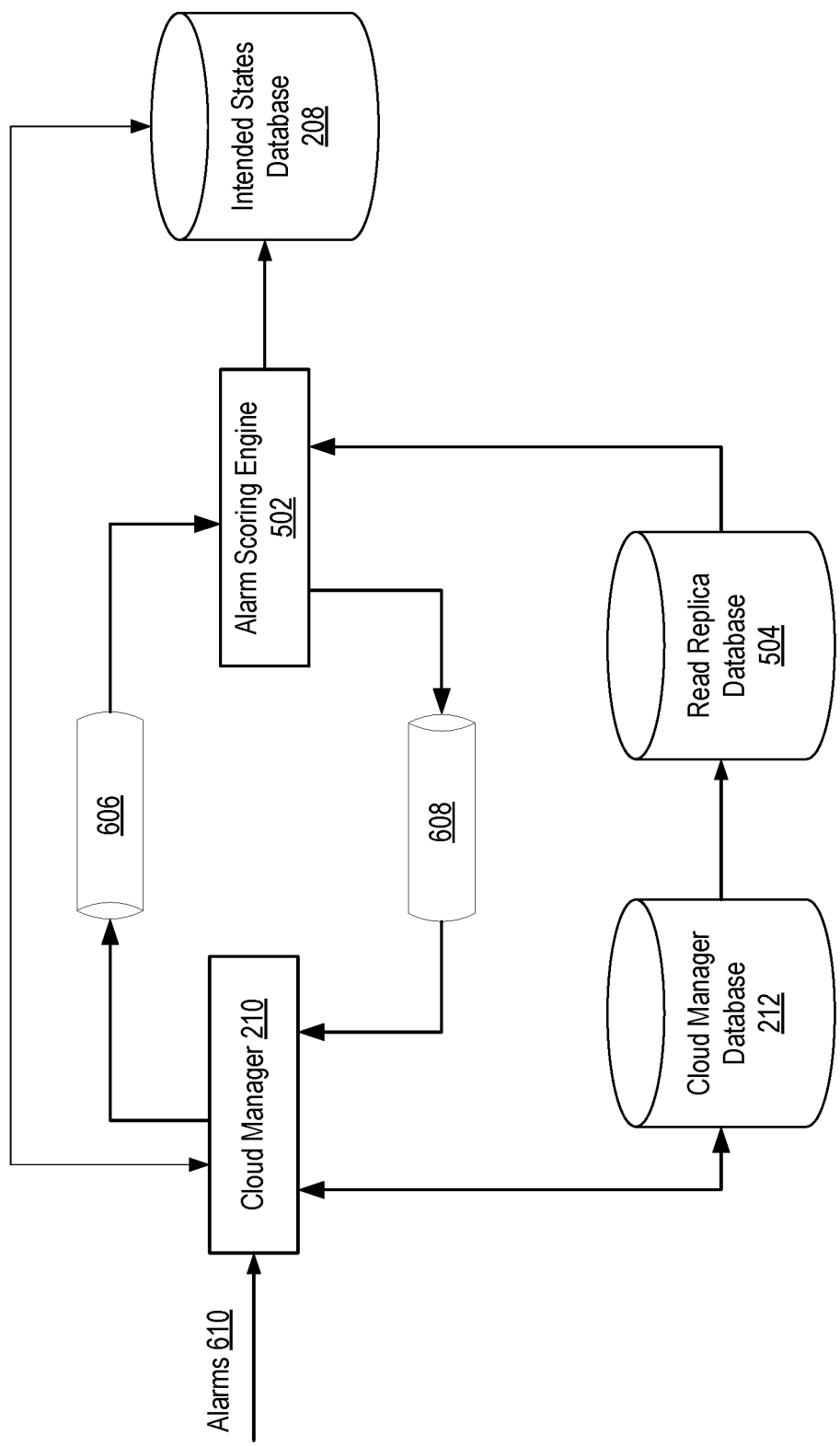
FIG. 6 illustrates an example of an alarm verification system, according to an embodiment.

FIG. 6 illustrates in greater detail an example of alarm verification, according to an embodiment. As shown, alarms 610 are received by cloud manager 210. As described, in a protected mode, alarms 610 are generated when a process performs an action that deviates from the behaviors of the process learned during a discovery mode. Cloud manager 210 stores alarms 610 received from host agents (e.g., host agent 129) in cloud manager database 212. Alarms 610 may generally be stored in any appropriate location, in cloud 202 or elsewhere. If the process associated with an alarm is modeled in intended states database 208, cloud manager 210 sends an identifier (ID) associated with an alarm to pending alarm queue 606. Next, alarm scoring engine 502 fetches alarm IDs from pending alarm queue 606. Alarm scoring engine 502 can continually fetch alarm IDs or can fetch alarm IDs on any suitable schedule.

Alarm scoring engine 502 reads alarm data from read replica database 504 of cloud manager database 212 using the alarm ID. In one embodiment, read replica database 504 contains a copy of all data stored in cloud manager database 212 and synchronizes with database 212 on a predetermined schedule. In this implementation, read replica database 504 is used instead of reading directly from cloud manager database 212. Using read replica database 504 shifts some of the read burden away from cloud manager database 212. If a burst of alarms is occurring, this implementation can improve performance.

Based on the identity of the process associated with an alarm 610, alarm scoring engine 502 fetches the intended states of the process from intended states database 208. By analyzing the alarm data and the intended states data, alarm scoring engine 502 determines whether an alarm is normal or not and assigns a score to the alarm. In one embodiment, alarm scoring engine 502 utilizes algorithm 3, above. In such a case, the sign function in $res(x_o)=sign(\Sigma_{t=1}^{T}\alpha_t \cdot res_t(x_o))$ may be removed (i.e., $res(x_o)=\Sigma_{t=1}^{T}\alpha_t \cdot res_t(x_o)$) to determine the score for an alarm. Further, the modified holo-entropy function HL' may return a different score, with the normal range being [1, 5] and the abnormal range (5, 7]. The results of alarm verification are stored by alarm scoring engine 502 in a results queue 608, from which cloud manager 210 fetches the results such that remediation actions may be taken. Examples of remediation actions include notifying a user of the results, killing a process, quarantining files, closing unauthorized connections, etc.

Figure 7:
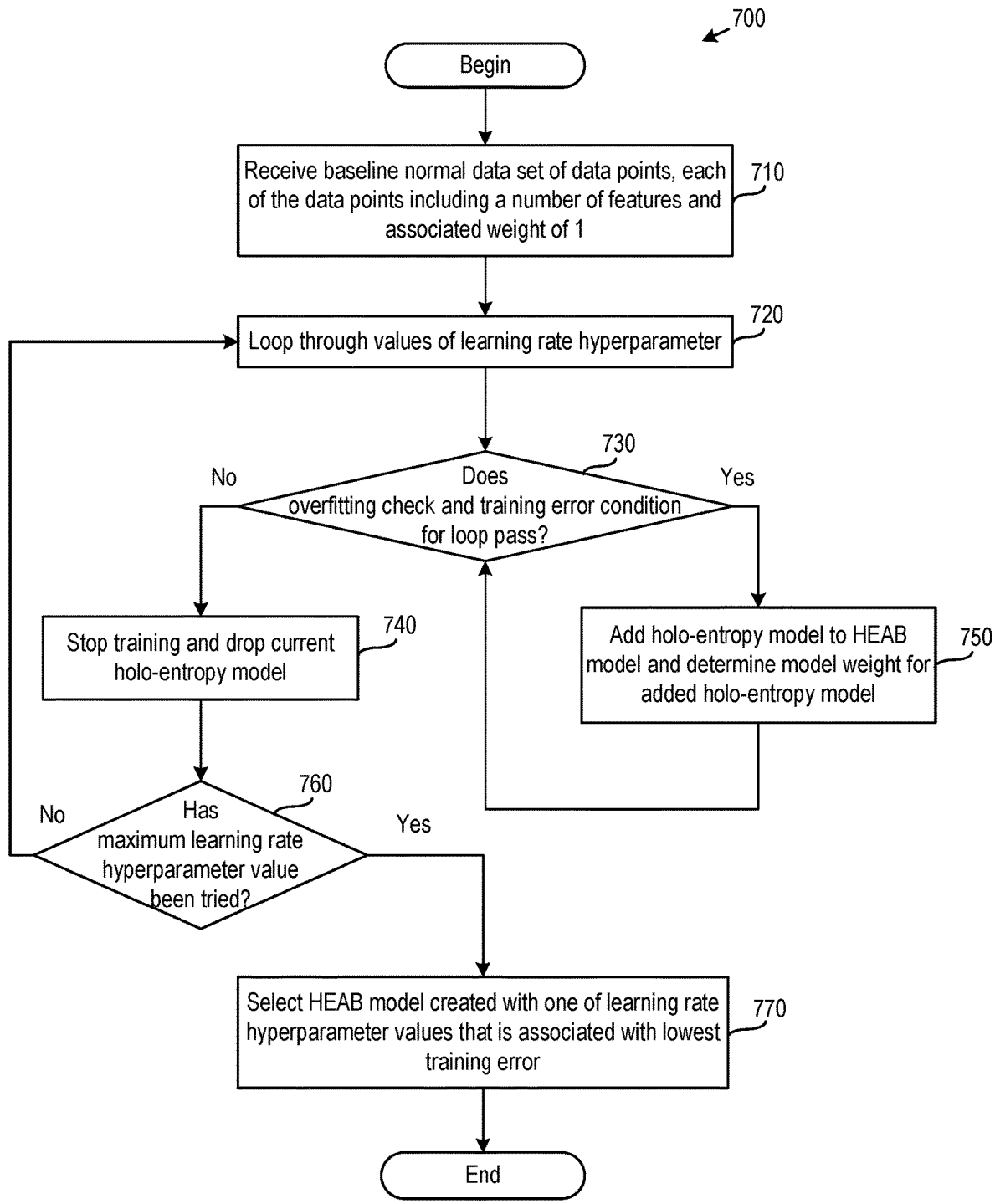
FIG. 7 is a flow diagram illustrating a method for creating a holo-entropy ada-boosting model, according to an embodiment.

FIG. 7 is a flow diagram illustrating a method 700 for creating a holo-entropy ada-boosting model, according to an embodiment. As shown, method 700 begins at step 710, where model creation engine 202 receives a baseline normal data set of data points, each of the data points including a number of features and an associated weight of 1. In one embodiment, the baseline normal data set may be the intended states of a process that includes data points comprising features extracted from monitored behaviors of the process, as described above. The baseline data points are further weighted, which is a modification to the traditional holo-entropy algorithm that enables adaptive boosting. The weight values are initially set to 1, and these weights are then updated during the training process. Although described with respect to receiving the baseline normal data set, model creation engine 202 may itself create the baseline normal data set in other embodiments.

At step 720, model creation engine 202 performs a loop through multiple values of a learning rate hyperparameter. Such a loop is used to search for a value of the learning rate hyperparameter (γ in algorithm 2) that produces a lowest error. In one embodiment, alarm scoring engine 502 may loop through values of the learning rate hyperparameter γ in algorithm 2 from 0.1 to 1, in increments of 0.1.

At step 730, model creation engine 202 performs a loop for adding holo-entropy models while an overfitting check passes and a training error is decreasing (i.e., the current training error is less than the training error from a previous iteration, if any). In one embodiment, the overfitting check may determine whether sensitive data points are mis-classified as normal by the current HEAB model, indicating that overfitting has occurred. As described, the sensitive data points may be a set of data points smaller than the baseline normal data set and including abnormal data points that are likely to be considered as normal. In alternative embodiments, the loop for adding holo-entropy models may be terminated based on other conditions, such as after a given number of holo-entropy models have been added.

If the overfitting check does not pass or the training error is not decreasing, then model creation engine 202 stops the training and drops the current holo-entropy model at step 740. On the other hand, if the overfitting check passes and the training error is decreasing, then at step 750, model creation engine 202 adds a holo-entropy model to the HEAB model and determines a model weight for the holo-entropy model. As described, each of the holo-entropy models includes the weight of each data point, and the model weights are used to combine the individual holo-entropy models in the HEAB model.

Figure 8:
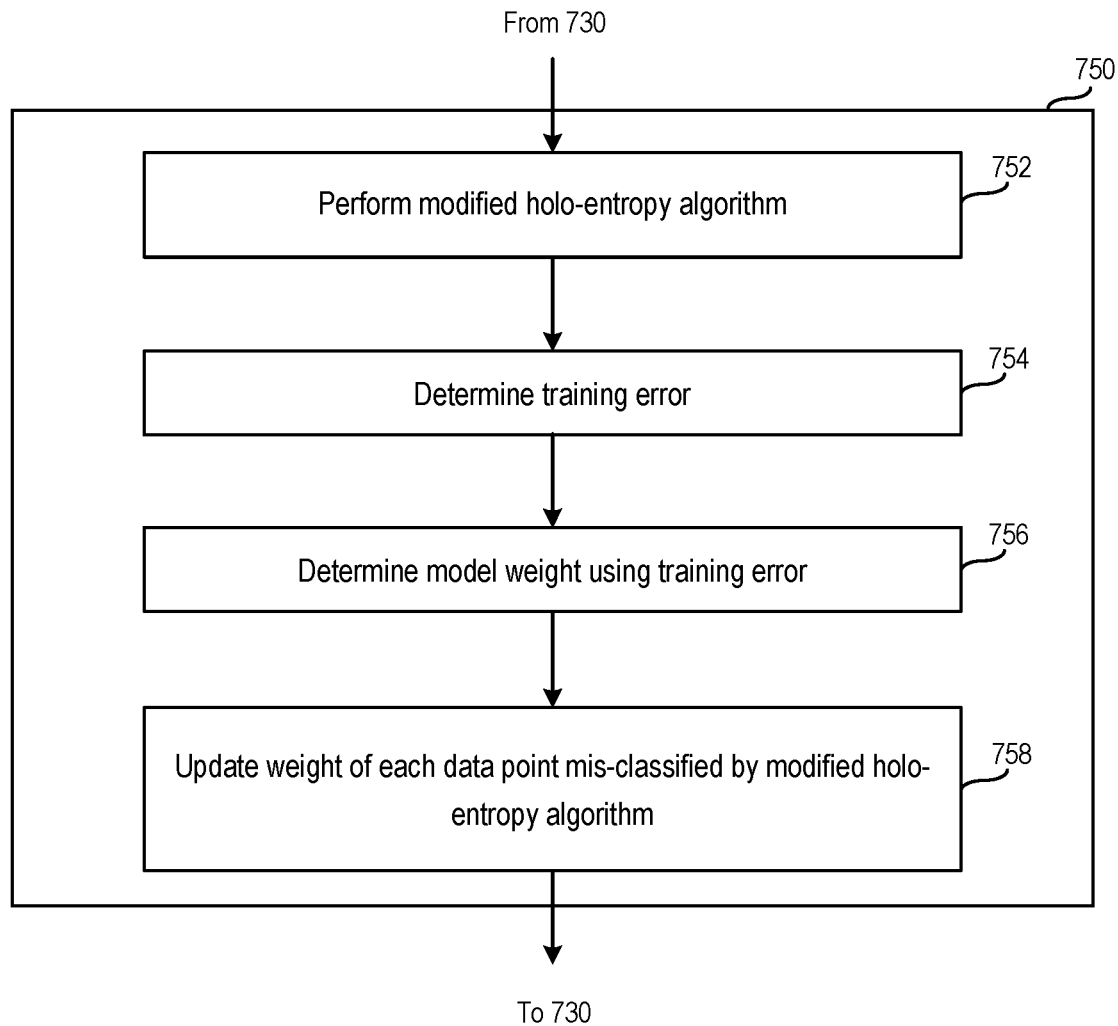
FIG. 8 illustrates one of the steps of the method of FIG. 7 in greater detail, according to an embodiment.

FIG. 8 illustrates adding the holo-entropy model and determining the model weight in step 750 in greater detail, according to an embodiment. As shown, at step 752, model creation engine 202 performs a modified holo-entropy algorithm. The modified holo-entropy algorithm at step 752 takes as inputs data points in the normal data set and associated weights, as well as a test data set that is the same as the normal data set, and outputs a classification of data points in the normal data set as normal or abnormal, i.e., $D_{abnormal}, D_{normal} \leftarrow HL(D^t, D_{test})$. In one embodiment, the modified holo-entropy algorithm is a modification to the traditional holo-entropy algorithm that assigns weights to each data point, performs a statistical calculation for each feature by adding the weight of each data point and dividing by the total weight to calculate the probability of equation (1) rather than counting the number of data points, and calculates an outlier factor for each data point according to equation (8), in which $n(y_j)$ represents the weighted summation of $y_j$ in the jth feature rather than the number of times that $y_j$ appears in the jth feature.

At step 754, model creation engine 202 determines a training error. The training error indicates a fraction of data points in the input normal data set that are mis-classified by the modified holo-entropy algorithm as abnormal. In one embodiment, the training error may be determined as $\epsilon_t \leftarrow len(D_{abnormal})/len(D^t)$. This is the same training error that is used to determine whether the training error is decreasing from iteration to iteration of the loop at step 750.

At step 756, model creation engine 202 determines a model weight using the training error. Such a model weight may be used in combining the output of the current holo-entropy model with the outputs of other holo-entropy models in the HEAB model. In one embodiment, the model weight may be determined as $\alpha_t = \gamma \ln$ $$\left(\frac{1-\epsilon_t}{\epsilon_t}\right),$$

where γ is a learning rate hyperparameter and ln $$\left(\frac{1-\epsilon_t}{\epsilon_t}\right)$$

is an error weight.

At step 758, model creation engine 202 updates the weight of each data point mis-classified by the modified holo-entropy algorithm. In one embodiment, the weights may be updated as $$\eta_{t+1}(i) = \frac{\eta_t(i)}{Z_t} * e^{\alpha_t},$$

where $HL(x_t) \neq y_i$ and $Z_t$ is a normalization factor. As described, the holo-entropy model that is added at each iteration of the loop includes the weight of each data point, i.e., $H_i = [\eta_i^1, \ldots, \eta_i^1]$, as updated at that iteration.

Returning to FIG. 7, after the holo-entropy model is added and the model weight is determined, method 700 returns to step 730, where model creation engine 202 continues looping while the overfitting check passes and the training error is decreasing. If the overfitting check does not pass or the training error is not decreasing, the looping ends and, as described above, model creation engine 202 stops the training and drops the current holo-entropy model at step 740. Then, at step 760, model creation engine 202 determines whether the maximum learning rate hyperparameter value has been tried. If the maximum learning rate hyperparameter value has not yet been tried, then method 700 returns to step 720, where model creation engine 202 continues looping through values of the learning rate hyperparameter. If, on the other hand, the maximum learning rate hyperparameter value has been tried, then at step 770, model creation engine 202 selects one of the HEAB models created with the various learning rate hyperparameter values that is associated with a lowest training error.

Figure 9:
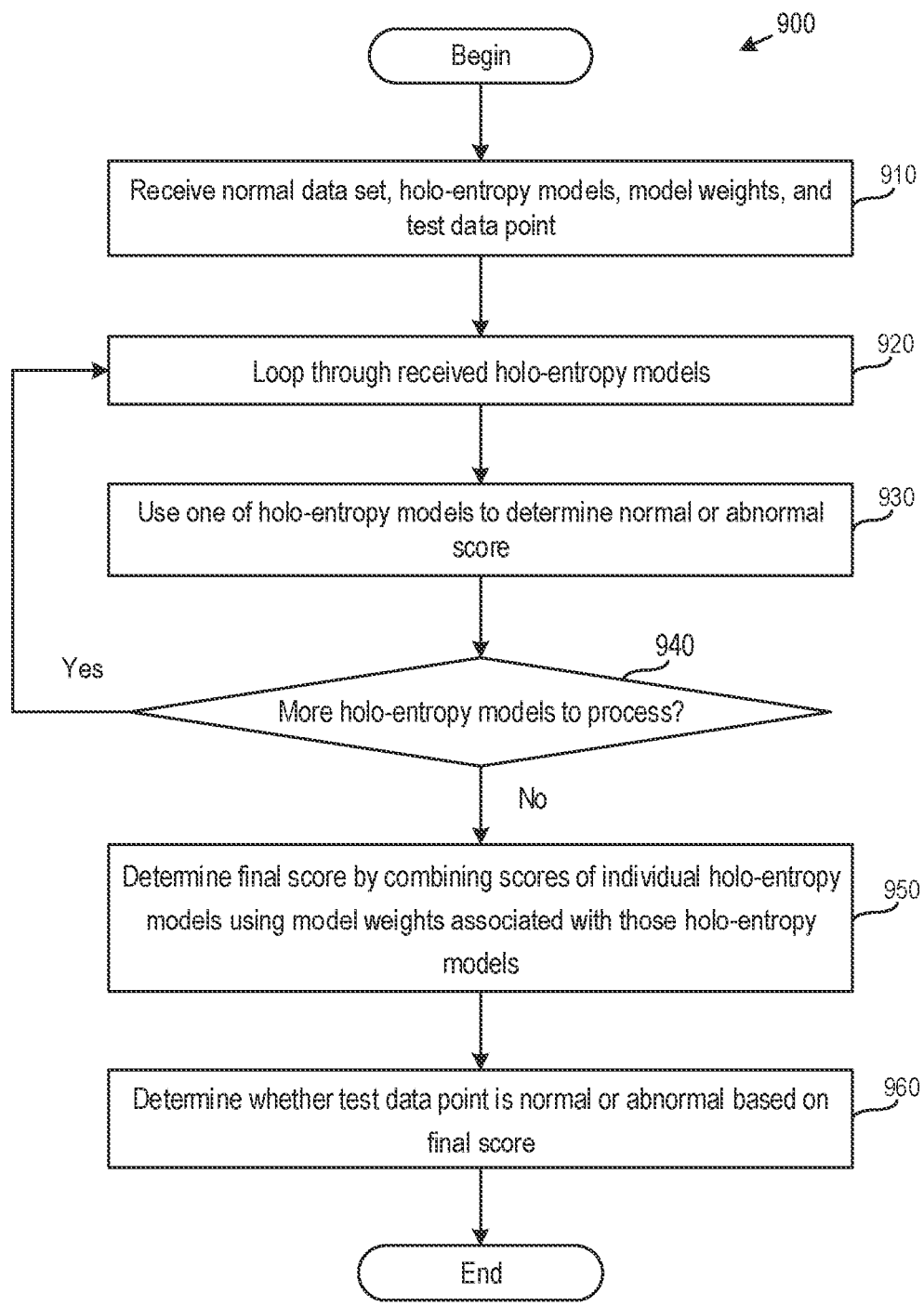
FIG. 9 is a flow diagram illustrating a method for verifying a data point using a holo-entropy adaptive boosting model, according to an embodiment.

FIG. 9 is a flow diagram illustrating a method 900 for verifying a data point using a holo-entropy ada-boosting model, according to an embodiment. As shown, method 900 begins at step 910, where anomaly detection system 206 or alarm scoring engine 502 receives a normal data set, holo-entropy models in the form of a sequence of data point weight sets, a sequence of model weights, and a test data point. In one embodiment, the test data point may include features extracted from behavior data that is collected and stored for a process by cloud manager 210 during a discovery mode and thereafter retrieved for verification (e.g., periodically) by anomaly detection system 202. Alternatively, the data point may include features extracted from an alarm that is raised during a protected mode when behavior of a process is observed that was not learned during the discovery mode and needs to be verified by alarm scoring engine 502. The goal is then to determine whether the test data point is normal or abnormal relative to the normal data set in the case of anomaly detection during the discovery mode described above, and also to determine a score indicating how abnormal the test data point is during the protected mode. As described, the normal data set may include intended states information of the process.

At step 920, anomaly detection system 206 or alarm scoring engine 502 loops through the received holo-entropy models. During such a loop, alarm scoring engine 502 uses one of the holo-entropy models to determine a normal or abnormal score at step 930. In one embodiment, anomaly detection system 206 or alarm scoring engine 502 performs the modified holo-entropy algorithm described above, given the holo-entropy model, to determine a normal or abnormal score, which is shown as $res_t(x_o) = HL'(x_o, X, H_t)$ in algorithm 3.

If anomaly detection system 206 or alarm scoring engine 502 determines that there are additional holo-entropy models to process at step 940, then method 900 returns to step 920, where anomaly detection system 206 or alarm scoring engine 502 continues looping through the received holo-entropy models. Otherwise, if there are no more holo-entropy models to process, then method 900 continues to step 950, where anomaly detection system 206 or alarm scoring engine 502 determines a final score by combining the scores of individual holo-entropy models that were determined at step 930 using model weights associated with those holo-entropy models. In the case of anomaly detection system 206 detecting anomalous behaviors during the discovery mode, the final score is calculated as a weighted majority vote function of the scores output by the holo-entropy models, i.e., $res(x_o) = sign(\Sigma_{t=1}^T \alpha_t \cdot res_t(x_o))$ in algorithm 3. In the case of alarm scoring engine 502 determining whether an alarm is an anomaly or not and scoring the alarm, the alarm scoring engine 502 may calculate the same weighted majority vote function of the scores output by the holo-entropy model but with the sign function removed, i.e., $res(x_o) = \Sigma_{t=1}^T \alpha_t \cdot res_t(x_o)$, to determine the score for an alarm (and/or calculate the same weighted majority vote function to determine whether the alarm is anomalous).

At step 960, anomaly detection system 206 or alarm scoring engine 502 determines whether the test data point is normal or abnormal based on the final score calculated at step 950. In the case where the sign function in the weighted majority vote function of the scores output by the holo-entropy models is not removed, i.e., $res(x_o) = sign(\Sigma_{t=1}^T \alpha_t \cdot res_t(x_o))$, the final score may be considered normal if it is 1 and abnormal if it is −1. In the case where the sign function in the weighted majority vote function of the scores output by the holo-entropy models is removed, i.e., $res(x_o) = \Sigma_{t=1}^T \alpha_t \cdot res_t(x_o)$, the final score may be indicative of how abnormal an alarm is. Further, the modified holo-entropy function HL' described above may return a score with the normal range being [1, 5] and the abnormal range (5, 7].

Figure 10:
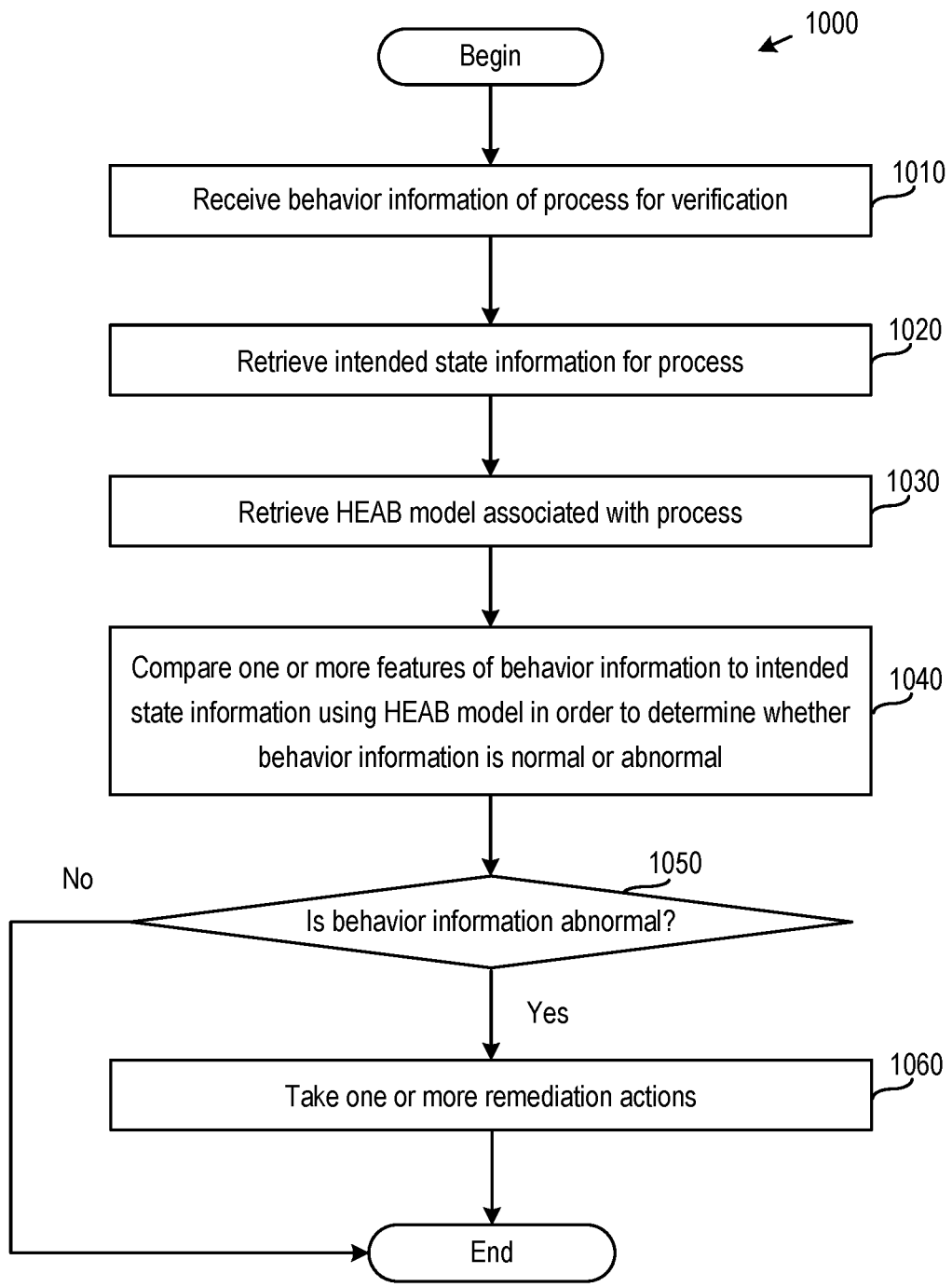
FIG. 10 is a flow diagram illustrating a method for anomaly detection during a discovery mode, according to an embodiment.

FIG. 10 is a flow diagram illustrating a method 1000 for anomaly detection during a discovery mode, according to an embodiment. As shown, method 1000 begins at step 1010, where anomaly detection system 206 receives behavior information of a process for verification. As described, behavior information may be continuously collected and stored for processing running in, e.g., a VM, by cloud manager 210 during the discovery mode, and anomaly detection system 202 may periodically (e.g., every five minutes) access the stored behavior information in order to retrieve data to verify.

At step 1020, anomaly detection system 206 retrieves intended state information for the process. The intended state information may be retrieved from, e.g., the intended state database 208 that is constructed for a number of processes. As described, each process may include one or more intended states, and features can make up a data set of records that define an intended state.

At step 1030, anomaly detection system 206 retrieves a HEAB model associated with the process. The HEAB model may be retrieved from, e.g., the model database 204 described above in which HEAB models that are created by model creation engine 202 offline are stored.

At step 1040, anomaly detection system 206 compares one or more features of the behavior information to the intended state information using the retrieved HEAB model in order to determine whether the retrieved behavior information is normal or abnormal. In one embodiment, alarm scoring engine 502 may perform method 900, described above, using the intended state information as a normal data set, the retrieved HEAB model, and a test data point including features extracted from the retrieved behavior information as input, in order to verify whether the behavior is normal or abnormal.

If the behavior information is determined to be abnormal at step 1050, then one or more remediation actions are taken in response at step 1060. For example, anomaly detection system 206 may store the results of the anomaly detection in a database (e.g., cloud manager database 212), and in turn cloud manager 210 may read the results and send a notification to an administrator or other user of the system when anomalous behavior is detected. A remediation broker or another component of the system may also automatically take one or more remedial actions to address anomalies, such as killing the process, quarantining files, closing unauthorized connections, etc. Further, a user or system administrator may create procedures or rules on what remediation actions to take under various circumstances in some embodiments.

Figure 11:
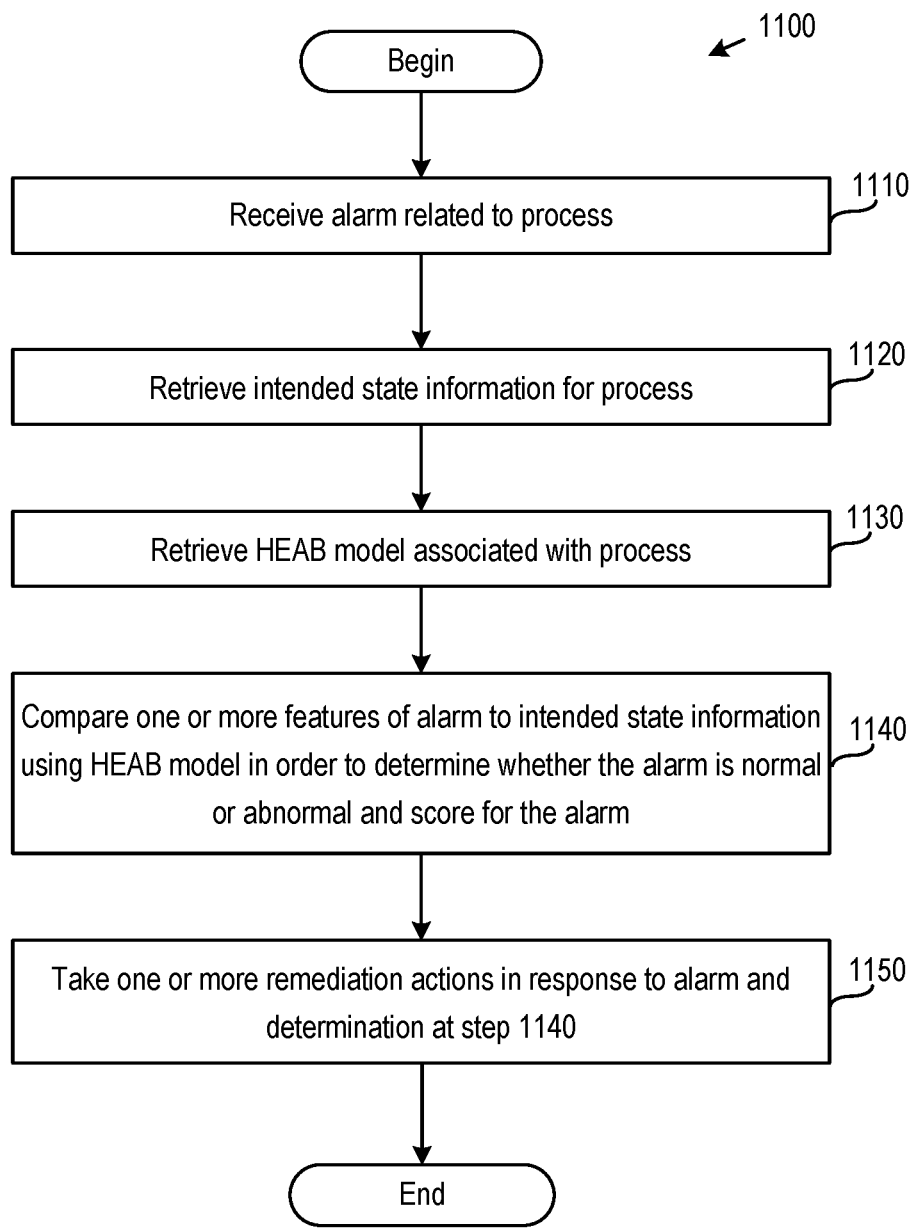
FIG. 11 is a flow diagram illustrating a method for alarm verification during a protected mode, according to an embodiment.

FIG. 11 is a flow diagram that illustrates a method 1100 for alarm verification during a protected mode, according to one embodiment. As shown, method 1100 begins at step 1110, where an alarm related to a process is received by alarm scoring engine 502. In one embodiment, the process may be one of the system processes described above and run in a VM, and the alarm may include one or more of the alarms 610 received by cloud manager 210 and stored in cloud manager database 212, from which alarm scoring engine 502 fetches the alarm, as described above with respect to FIG. 6.

At step 1120, alarm scoring engine 502 retrieves intended state information for the process. Similar to step 1020, the intended state information may be retrieved from, e.g., intended state database 208.

At step 1130, alarm scoring engine 502 retrieves a HEAB model associated with the process. Similar to step 1030, the HEAB model may be retrieved from, e.g., the model database 204 described above.

At step 1140, alarm scoring engine 502 compares one or more features of the alarm to the intended state information using a HEAB model in order to determine whether the alarm data is normal or not and a score for the alarm. In one embodiment, alarm scoring engine 502 may perform method 900, described above, using the intended state information as a normal data set, the retrieved HEAB, and a test data point including features extracted from the alarm as input, in order to verify whether the alarm is normal or abnormal and determine the score for the alarm.

At step 1150, one or more remediation actions are taken in response to the alarm and the determination made using the HEAB model at step 1140. For example, cloud manager 204 may send a notification for the alarm and the computed score to an administrator or other user of the system. A remediation broker or another component of the system may also automatically take one or more remedial actions to address alarms, such as killing the process, quarantining files, closing unauthorized connections, etc. Further, a user or system administrator may create procedures or rules on what remediation actions to take under various circumstances in some embodiments.

Although described above primarily with respect to training a HEAB model using a normal data set and applying the trained model, it should be noted that the normal data set may be updated as, e.g., the normal behaviors of a process evolves, such as after a software upgrade. In such cases, the HEAB model may be retrained using the updated normal data set.

Advantageously, embodiments disclosed herein provide an improved anomaly detection system that can be used to determine whether data, such as behavior data or alarms associated with a system process, is normal or abnormal relative to a normal data set, such as intended state(s) associated with the system process, as well as calculate a score indicating how abnormal an alarm is. Experience has shown that HEAB models can perform better than traditional holo-entropy models at anomaly detection when data points in a baseline normal data set are from a multimodal distribution with more than one peak, in which case data points coming from minor modes in the baseline may be considered as anomalies by traditional holo-entropy models. Further, HEAB models can be trained using relatively little label data, which may be difficult to obtain such as in the case of processes running in virtual computing instances, where it may be difficult to find many virtual computing instances providing valid services. As a result, use of HEAB models can reduce the risk of malware and attack vectors, provide greater security, and reduce the incidence of false positives in anomaly detection and alarm verification so that excessive user warning notifications are not generated and processes are not stopped that should continue running.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the client or endpoint and hypervisors as an example for the hardware abstraction layer. As described above, each virtual machine includes a guest operating system in which at least one application runs. These embodiments may also apply to other examples of endpoints/clients, such as containers, which do not include a guest operating system, referred to herein as "OS-less containers." OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in user space on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

In addition, while described virtualization methods have generally assumed that virtual machines present interfaces consistent with a particular hardware system, the methods described may be used in conjunction with virtualizations that do not correspond directly to any particular hardware system. Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. A computer-implemented method for determining whether data is anomalous, the method comprising:
   generating a holo-entropy adaptive boosting model using, at least in part, a set of normal data, wherein the holo-entropy adaptive boosting model includes a plurality of holo-entropy models and associated model weights for combining outputs of the plurality of holo-entropy models, wherein generating the holo-entropy adaptive boosting model comprises, while an overfitting check passes and a training error is decreasing during training of the holo-entropy adaptive boosting model, iteratively adding a new holo-entropy model to the holo-entropy adaptive boosting model, and wherein adding the new holo-entropy model comprises:
      determining a training error value of the training error;
      determining a model weight for the new holo-entropy model using, at least in part, the training error value; and
      updating corresponding weights of data points in the set of normal data that are mis-classified by the new holo-entropy model, wherein the corresponding weights of the data points in the set of normal data are used for the new holo-entropy model;
   receiving additional data; and
   determining at least one of (a) whether the additional data is normal or abnormal relative to the set of normal data or (b) a score indicative of how abnormal the additional data is using, at least in part, the generated holo-entropy adaptive boosting model.

2. The method of claim 1, wherein generating the holo-entropy adaptive boosting model includes:
   receiving the set of normal data, each data point in the set of normal data including one or more features that are assigned an initial weight of 1.

3. The method of claim 1, wherein the overfitting check includes determining whether a set of sensitive data points that are abnormal are classified as normal by the holo-entropy adaptive boosting model.

4. The method of claim 1, wherein adding the new holo-entropy model and determining the model weight for the new holo-entropy model includes:
   performing a modified holo-entropy algorithm, wherein:
      the modified holo-entropy algorithm takes as inputs data points in the set of normal data, respective weights associated with the data points in the set of normal data, and a test data set that is the same as the set of normal data, and
      in the modified holo-entropy algorithm, a weight is assigned to each data point, the weight of each data point is used to calculate a probability, and an outlier factor is calculated using a weighted summation of features.

5. The method of claim 1, further comprising, looping over a plurality of values of a learning rate hyperparameter and, during the looping, iteratively performing the steps of while the overfitting check passes and the training error is decreasing, adding the new holo-entropy model and determining the model weight for the new holo-entropy model.

6. The method of claim 5, wherein the plurality of values of the learning rate hyperparameter include values from 0.01 to 1 in increments of 0.01.

7. The method of claim 1, wherein determining at least one of (a) whether the additional data is normal or abnormal relative to the set of normal data or (b) the score indicative of how abnormal the additional data includes:
determining, using each of the plurality of holo-entropy models in the holo-entropy adaptive boosting model, a respective score; and
combining the determined scores based, at least in part, on the model weight associated with each of the holo-entropy models.

8. The method of claim 1, wherein:
the additional data is associated with at least one behavior of a process or an alarm generated by at least one behavior of the process; and
the set of normal data includes intended state information for the process associated with a baseline of behaviors for the process.

9. The method of claim 8, wherein the process is a system process executed in one or more virtual computing instances.

10. The method of claim 8, wherein at least one feature in the set of normal data comprises a connection on a port associated with the process.

11. The method of claim 1, further comprising, taking remedial action in response to determining the additional data is abnormal.

12. A non-transitory computer-readable medium comprising instructions to be executed in a processor of a computer system, the instructions when executed in the processor cause the computer system to carry out a method for determining whether data is anomalous, comprising:
generating a holo-entropy adaptive boosting model using, at least in part, a set of normal data, wherein the holo-entropy adaptive boosting model includes a plurality of holo-entropy models and associated model weights for combining outputs of the plurality of holo-entropy models, wherein generating the holo-entropy adaptive boosting model comprises, while an overfitting check passes and a training error is decreasing during training of the holo-entropy adaptive boosting model, iteratively adding a new holo-entropy model to the holo-entropy adaptive boosting model, and wherein adding the new holo-entropy model comprises:
determining a training error value of the training error;
determining a model weight for the new holo-entropy model using, at least in part, the training error value; and
updating corresponding weights of data points in the set of normal data that are mis-classified by the new holo-entropy model, wherein the corresponding weights of the data points in the set of normal data are used for the new holo-entropy model;
receiving additional data; and
determining at least one of (a) whether the additional data is normal or abnormal relative to the set of normal data or (b) a score indicative of how abnormal the additional data is using, at least in part, the generated holo-entropy adaptive boosting model.

13. The non-transitory computer-readable medium of claim 12, wherein generating the holo-entropy adaptive boosting model includes:
receiving the set of normal data, each data point in the set of normal data including one or more features that are assigned an initial weight of 1.

14. The non-transitory computer-readable medium of claim 12, wherein the overfitting check includes determining whether a set of sensitive data points that are abnormal are classified as normal by the holo-entropy adaptive boosting model.

15. The non-transitory computer-readable medium of claim 12, wherein adding the new holo-entropy model and determining the model weight for the new holo-entropy model includes:
performing a modified holo-entropy algorithm, wherein:
the modified holo-entropy algorithm takes as inputs data points in the set of normal data, respective weights associated with the data points in the set of normal data, and a test data set that is the same as the set of normal data, and
in the modified holo-entropy algorithm, a weight is assigned to each data point, the weight of each data point is used to calculate a probability, and an outlier factor is calculated using a weighted summation of features.

16. The non-transitory computer-readable medium of claim 12, the method further comprising, looping over a plurality of values of a learning rate hyperparameter and, during the looping, iteratively performing the steps of while the overfitting check passes and the training error is decreasing, adding the new holo-entropy model and determining the model weight for the new holo-entropy model.

17. The non-transitory computer-readable medium of claim 16, wherein the plurality of values of the learning rate hyperparameter include values from 0.01 to 1 in increments of 0.01.

18. The non-transitory computer-readable medium of claim 12, wherein determining at least one of (a) whether the additional data is normal or abnormal relative to the set of normal data or (b) the score indicative of how abnormal the additional data includes:
determining, using each of the plurality of holo-entropy models in the holo-entropy adaptive boosting model, a respective score; and
combining the determined scores based, at least in part, on the model weight associated with each of the holo-entropy models.

19. The non-transitory computer-readable medium of claim 12, wherein:
the additional data is associated with at least one behavior of a process or an alarm generated by at least one behavior of the process; and
the set of normal data includes intended state information for the process associated with a baseline of behaviors for the process.

20. A computer system comprising:
a processor; and
a memory, wherein the memory includes a program executable in the processor to perform operations for determining whether data is anomalous, the operations comprising:
generating a holo-entropy adaptive boosting model using, at least in part, a set of normal data, wherein the holo-entropy adaptive boosting model includes a plurality of holo-entropy models and associated model weights for combining outputs of the plurality of holo-entropy models, wherein generating the holo-entropy adaptive boosting model comprises, while an overfitting check passes and a training error is decreasing during training of the holo-entropy adaptive boosting model, iteratively adding a new holo-entropy model to the holo-entropy adaptive boosting model, and wherein adding the new holo-entropy model comprises:

- determining a training error value of the training error;
- determining a model weight for the new holo-entropy model using, at least in part, the training error value; and
- updating corresponding weights of data points in the set of normal data that are mis-classified by the new holo-entropy model, wherein the corresponding weights of the data points in the set of normal data are used for the new holo-entropy model;

receiving additional data; and determining at least one of (a) whether the additional data is normal or abnormal relative to the set of normal data or (b) a score indicative of how abnormal the additional data is using, at least in part, the generated holo-entropy adaptive boosting model.

\* \* \* \* \*